(12) United States Patent
Tadano

(10) Patent No.: US 7,407,208 B2
(45) Date of Patent: Aug. 5, 2008

(54) JOINT DRIVE MECHANISM AND ROBOT HAND

(75) Inventor: Hiroyuki Tadano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/264,175

(22) Filed: Oct. 31, 2005

(65) Prior Publication Data

US 2006/0131908 A1    Jun. 22, 2006

(30) Foreign Application Priority Data

Nov. 1, 2004  (JP)  ............................. 2004-318248

(51) Int. Cl.
B25J 15/10  (2006.01)
(52) U.S. Cl. .......................................... 294/111; 901/39
(58) Field of Classification Search ................. 294/111, 294/106; 901/36, 39
See application file for complete search history.

(56) References Cited

U.S. PATENT DOCUMENTS 5,062,673 A * 11/1991 Mimura ....................... 294/111
5,447,403 A *  9/1995 Engler, Jr. ................... 294/111
5,570,920 A * 11/1996 Crisman et al. ............. 294/111
6,379,393 B1 *  4/2002 Mavroidis et al. ............ 623/57

FOREIGN PATENT DOCUMENTS

| JP | 2001-287182 | 10/2001 |
| JP | 2003-181787 | 7/2003 |
| JP | 2004-092332 | 3/2004 |

* cited by examiner

*Primary Examiner*—Saul Rodriguez
*Assistant Examiner*—Paul T Chin
(74) *Attorney, Agent, or Firm*—David G. Conlin; David A. Tucker; Edwards Angell Palmer & Dodge LLP

(57) ABSTRACT

A joint drive mechanism includes a plurality of link members linked via a joint portion. A drive portion is associated with the joint portion for driving the joint portion such that the link members attached thereto can be moved relative to one another in a controlled fashion. The drive portion includes a plurality of drive elements that each are capable of expanding or contracting in response to an applied electric signal so as to provide different drive outputs to the joint portion. In one embodiment, a joint portion connects link members simulating portions of a human finger. The drive portion includes a pair of drive elements connected to the joint portion by a transmission member. Each of the drive elements is expanded or contracted equally and oppositely relative to the other drive element in response to controlled applied electrical signals.

2 Claims, 8 Drawing Sheets

(a)

(b)

(a)

(b)

(a)

(b)

(a)

(b)

JOINT DRIVE MECHANISM AND ROBOT HAND

BACKGROUND OF THE INVENTION

This application claims priority under U.S.C. § 119(a) on Patent Application No. 2004-318248 filed in Japan on Nov. 01, 2004, the entire contents of which are hereby incorporated by reference.

The present invention relates to a joint drive mechanism and a robot hand that can perform manual procedures by driving a plurality of finger mechanisms.

In this type of robot hands, in each joint portion a motor is provided, and the joint portions are directly rotated with the respective motors, bending and stretching the finger mechanisms. In such a robot hand mechanism, it is possible to rotate each joint of the finger mechanisms separately and a high degree of freedom of the finger mechanism can be achieved (see JP 2001-287182A, for example (hereinafter referred to as Patent Document 1)).

In other conventional apparatuses, the joint portions are linked by a wire and all finger mechanisms of the robot hand can be bent and stretched by pulling only this one wire. With such a robot hand mechanism, the number of drive sources can be reduced (see JP 2003-181787A for example (hereinafter referred to as Patent Document 2)).

However, when a motor serving as the drive source is installed in each joint part of the finger mechanisms in order to establish a high degree of freedom, as described in Patent Document 1, the finger mechanisms increase in size and a size equivalent to a human hand cannot be realized. Furthermore, since the front tips of the finger mechanisms are also equipped with a motor and are heavy, the motors at the base portion of the finger mechanisms require a large torque and the size of the robot hand further increases.

Moreover, in Patent Document 2, since the finger mechanism of the robot hand is bent and stretched by one motor, the hand has a complex configuration and since the degree of freedom is "1", the robot hand cannot perform complex movements.

Accordingly, it was extremely difficult to realize a robot hand provided with a high degree of freedom and with a size equivalent to that of a human hand.

Therefore the present invention has been devised in light of these problems of the conventional art and it is an object thereof to provide a lightweight and compact joint drive mechanism, or more specifically, a robot hand with a high degree of freedom even and a size equivalent to that of a human hand, having a lightweight and compact joint drive mechanism.

SUMMARY OF THE INVENTION

In order to obtain the above-mentioned object, a joint drive mechanism according to the present invention is provided with a plurality of link members linked via a link portion, and a drive portion driving the joint portion, the drive portion comprising a plurality of drive elements with different outputs.

With the above-mentioned configuration, in a joint drive mechanism according to the present invention, it is possible to use direct-drive actuators with different outputs for the drive elements, the link element may be operated by the direct-drive actuator with the stronger output in a direction where a strong driving force is required, and it may be operated by the actuator with the weaker output in a direction where a small driving force is required.

In order to obtain the above-mentioned object, a robot hand mechanism according to the present invention is provided with a main frame, a plurality of finger mechanisms connected to the main frame and including a plurality of joint portions, and a plurality of drive portions driving the joint portions, wherein the drive portions comprise a plurality of drive elements with different outputs.

In the above-mentioned configuration of a robot hand according to the present invention, the drive portion may comprise two drive elements with different outputs, wherein the drive element with the stronger output is driven when the robot hand grasps an object, and the drive element with the weaker output is driven when the robot hand releases the object.

More specifically, a robot hand according to the present invention uses direct-drive actuators with different outputs for the drive elements used to drive the joint portions of the robot hand finger mechanisms, and uses a direct-drive actuator with strong output for the drive element related to the grasping force and an actuator with weak output for the drive element not related to the grasping force, which makes it possible to realize a lightweight and compact robot hand.

In a configuration as described above, when F is a grasping force operating on a grasped object, L1 is a distance from the center of the joint to the point of action of the grasping force, L2 is a distance from the center of the joint portion to the point of action of the output of the drive elements, F1 is a force preventing a rotational driving of the joint portion, Fa is the output of the drive element with the weaker output and Fb is the output of the drive element with the stronger output, then Fa and Fb can be respectively expressed as $Fa = F1$, and $Fb = F1 + F2$ (where $F2 = F \times L1/L2$).

It is preferable that the drive elements used in a joint drive mechanism and a robot hand according to the present invention expand and contract by themselves through an electric signal. In this case, the amount of contraction and expansion of the drive elements can be controlled by a computer and the control of the joint portions can be performed easily. Accordingly, complex grasping operations can be realized by the generation of an appropriate grasping force and the precise positioning of the finger mechanisms.

It is preferable that in the joint drive mechanism and the robot hand according to the present invention, the joint portions are driven via a driving force transmission portion, such as a wire or the like, transmitting a driving force of the drive elements to the joint portion. It is possible to install the drive elements in appropriate locations and downscale the configuration of the robot hand to a compact size by using the driving force transmission portion to link the joint portion and the drive elements. Also, the drive elements are not limited with regard to their installation location and it is possible to employ direct-drive actuators of various specifications. It is further preferable to use a wire as the driving force transmission portion In a joint drive mechanism and robot hand according to the present invention, the drive elements used in the joint drive mechanism and the robot hand may be provided with a hollow portion, and the driving force transmission portion may be passed through the hollow portion of the drive elements and fixed to the drive elements. In this case, the configuration of the robot hand can be downscaled to compact size by providing a hollow portion in the drive elements.

The joint drive mechanism and robot hand according to the present invention may also be provided with a guide means for guiding the drive elements, which are used by the joint drive mechanism and the robot hand, in their direction of expansion and contraction. In this case, the output of the drive elements and the grasping operation can be stabilized.

As mentioned above, according to the present invention, a lightweight and compact joint drive mechanism can be produced easily, and furthermore, a robot hand able to perform complex operations, having a high degree of freedom even though its joint drive mechanism is light and small and it has the size of a human hand.

BRIEF DESCRIPTION OF THE DRAWINGS

FIG. 1(a) is a front view of the entire robot hand. FIG. 1(b) is a top view of the robot hand.

FIG. 3(a) is a top view of the finger mechanism of the robot hand when grasping a grasped object. FIG. 3(b) is a top view of the finger mechanism of the robot hand when releasing the grasped object.

FIG. 8(a) is a perspective view and FIG. 8(b) is a schematic cross-sectional view thereof.

DESCRIPTION OF THE PREFERRED EMBODIMENTS

The following is a detailed explanation of embodiments of a robot hand according to the present invention with reference to the accompanying drawings.

Embodiment 1

Figure 1:
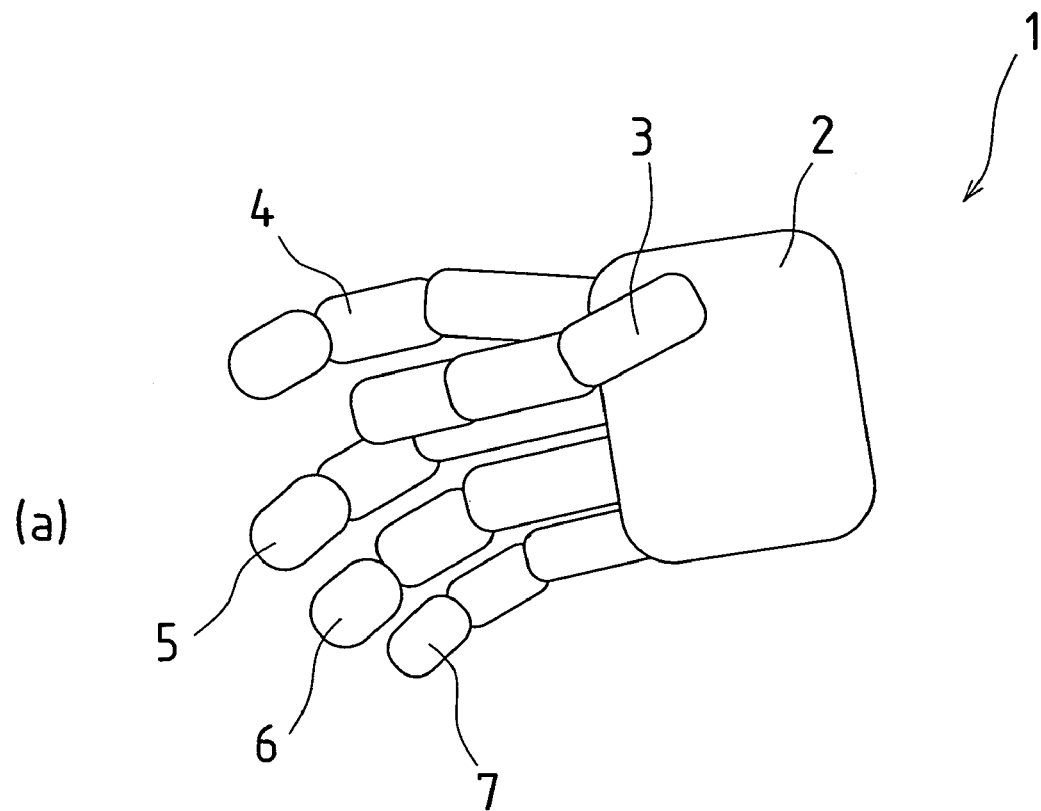
FIG. 1 is a figure showing a robot hand according to Embodiment 1 of the present invention.
Figure 1:
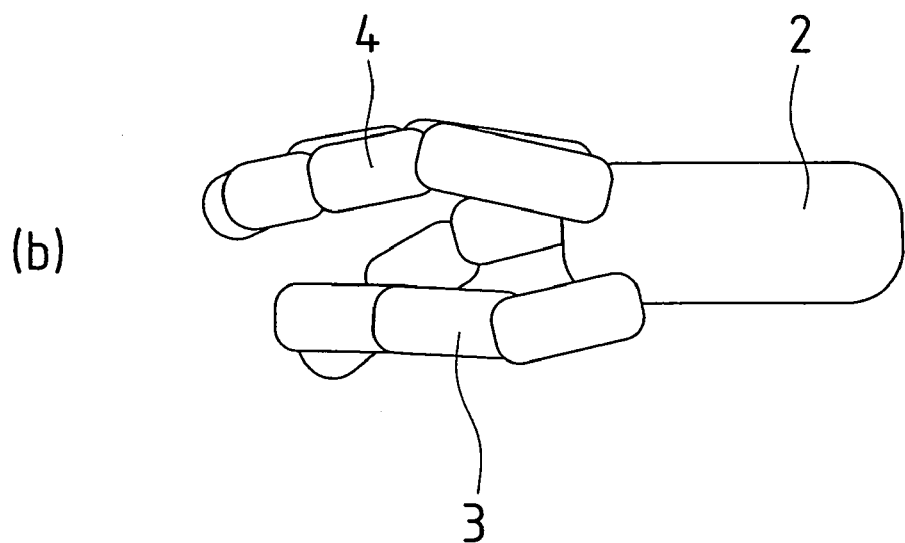

FIG. 1(a) and FIG. 1(b) show a robot hand 1 according to an embodiment of the present invention. FIG. 1(a) is a front view of the entire robot hand, while FIG. 1(b) is a top view of the entire robot hand. The robot hand 1 is provided with a main frame 2, which corresponds to the palm of a human hand, and a plurality of finger mechanisms 3, 4, 5, 6, 7, attached to the main frame 2. The finger mechanism 3 corresponds to a human thumb, the finger mechanism 4 corresponds to a human index finger, the finger mechanism 5 corresponds to a human middle finger, the finger mechanism 6 corresponds to a human ring finger, and the finger mechanism 7 corresponds to a human little finger. Therefore, as shown in FIG. 1, the insides of the finger mechanism 3 and the finger mechanism 4 are arranged in reciprocal opposition to each other, and the finger mechanisms 4, 5, 6, 7 are lined up side by side.

The robot hand 1 according to this Embodiment 1 is not limited to a configuration comprising five finger mechanisms, as illustrated in the example, but it can also comprise more or fewer finger mechanisms. However, at least two finger mechanisms are necessary to grasp an object and at least three finger mechanisms are necessary to change the orientation of a grasped object or the grasping position. Moreover, when a robot hand modeled after the human hand is required, it is preferable to have five finger mechanisms in the manner of the embodiments according to the present invention.

Figure 4:
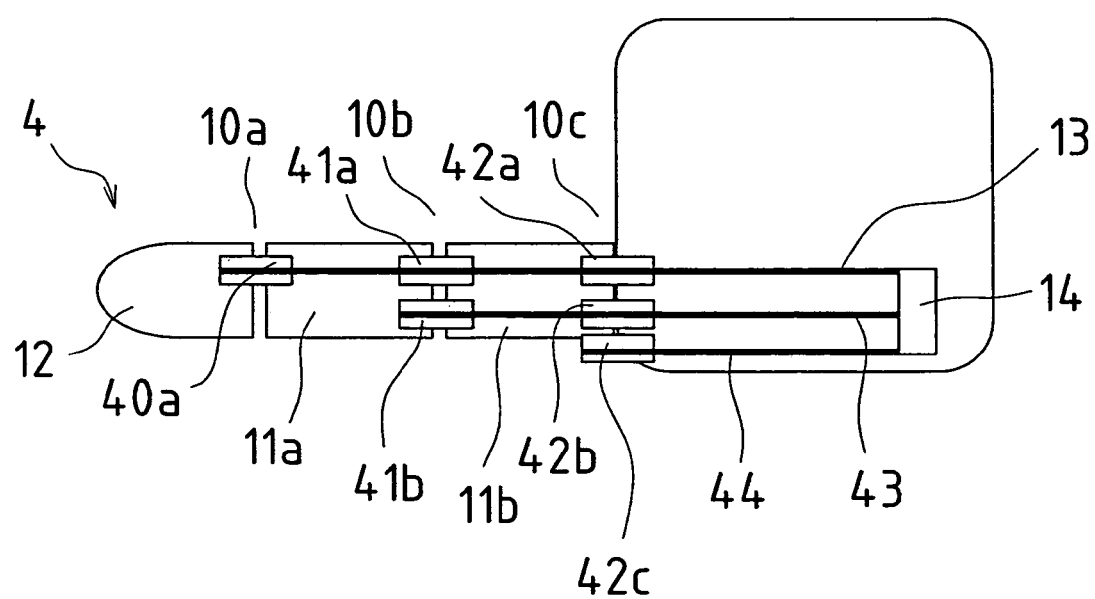
FIG. 4 is a front view of the configuration of the finger mechanism of the robot hand according to Embodiment 1 of the present invention.

FIG. 4 shows the configuration of the finger mechanism 4. Since the configuration of the other finger mechanisms 3, 5, 6, 7 is the same, their graphic representation or detailed explanation is omitted. The finger mechanism 4 comprises finger frames 11a, 11b and a finger tip portion 12 serving as a plurality of link members, and joint portions 10a, 10b, 10c connecting them.

The joint portion 10a linking the finger tip portion 12 and the finger frame 11a includes a drive pulley 40a. The joint portion 10b linking the finger frames 11a and 11b includes an idler pulley 41a and a drive pulley 41b. The joint portion 10c linking the finger frame 11b to the main frame 2 includes idler pulleys 42a, 42b and a drive pulley 42c.

Each of the drive pulleys 40a, 41b, 42c is linked to drive portions 13, 43, 44, that rotatively drive the joint portions. More specifically, when the drive portion 13 is driven and the joint portion 10a rotates, the finger tip portion 12 also rotates around the joint portion 10a. When the drive portion 43 is driven and the joint portion 10b rotates, the frame 11a, the rotation portion 10a and the finger tip portion located towards the finger tip rotate around rotation portion 10b. When the drive portion 44 is driven and the joint portion 10c rotates, the frames 11a, 11b, the finger tip portion 12 and the joint portions 10a, 10b located further towards the finger tip rotate around the joint portion 10c.

Hereinafter the principle of driving of the joint portions will be explained.

Figure 2:
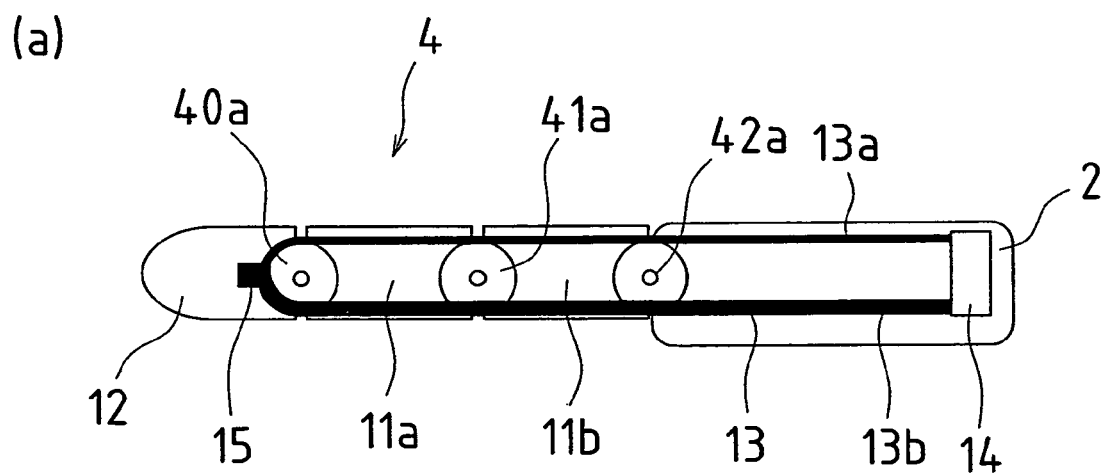
FIG. 2(a) is a schematic cross-sectional view showing a finger mechanism of the robot hand according to Embodiment 1 of the present invention.
FIG. 2(b) is an enlarged view thereof.
Figure 2:
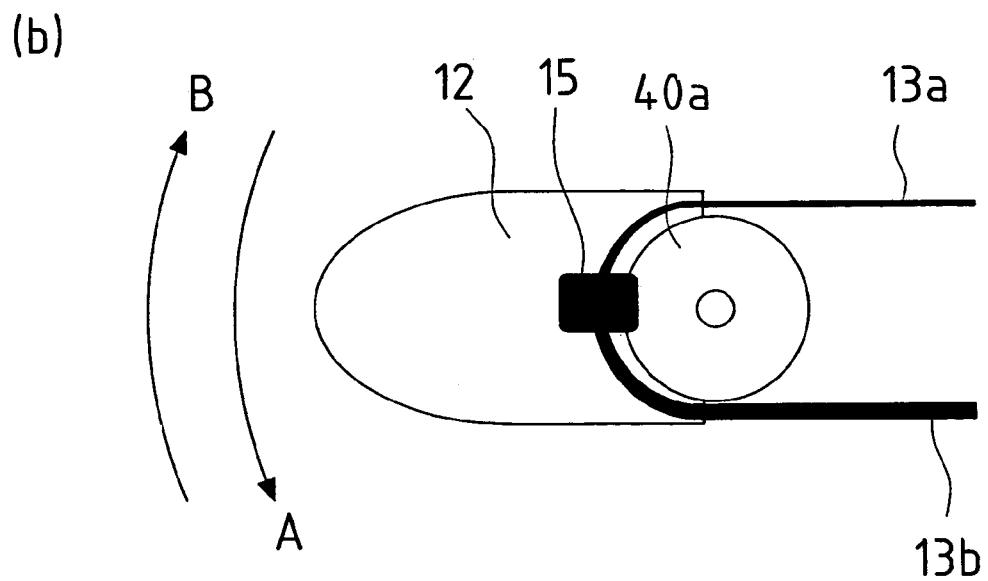

FIG. 2(a) and FIG. 2(b) illustrate how the joint portion 10a linking the finger tip portion 12 and the finger frame 11a is driven. Since the other joint portions 10b, 10c are driven according to the same principle, their graphical representation and further explanation is omitted.

The drive portion 13, which is linked to the joint portion 10a, comprises two types of cord-shaped drive elements 13a, 13b with different outputs. The respective ends of the one drive element 13a and the other drive element 13a are with attached to a drive element fixing base 14, provided in the frame 2. Moreover, the respective other ends of the two drive elements 13a, 13b are attached to the drive pulley 40a, through the idler pulleys 41a, 42a and via a drive element connector 15, provided on the drive pulley 40a.

The drive elements 13a, 13b are direct drive elements, which can be contracted or expanded through an electric signal. An example for such drive elements is a polymer actuator. Various kinds of polymer actuators have been developed, and they are expected to be used in a number of fields due to their, compact size and light weight.

When the one drive element 13a expands and the other drive element 13b contracts, the joint portion 10a is rotatively driven and the finger tip 12 rotates in the direction marked by the arrow A (bending direction). Moreover, when the one drive element 13a contracts and the other drive element 13b expands, the joint portion 10a is rotatively driven and the finger tip 12 rotates in the direction marked by the arrow B (expanding direction). Further, the output of the drive elements 13a and 13b, that is, the force of contracting and pulling objects (the force rotatively driving the drive pulley 40a in the direction A or the direction B according to the present embodiment), may not be the same. However, in this case, since a very strong force is needed to grasp objects, the drive elements become large and it becomes impossible to downscale the size of the robot hand.

Figure 3:
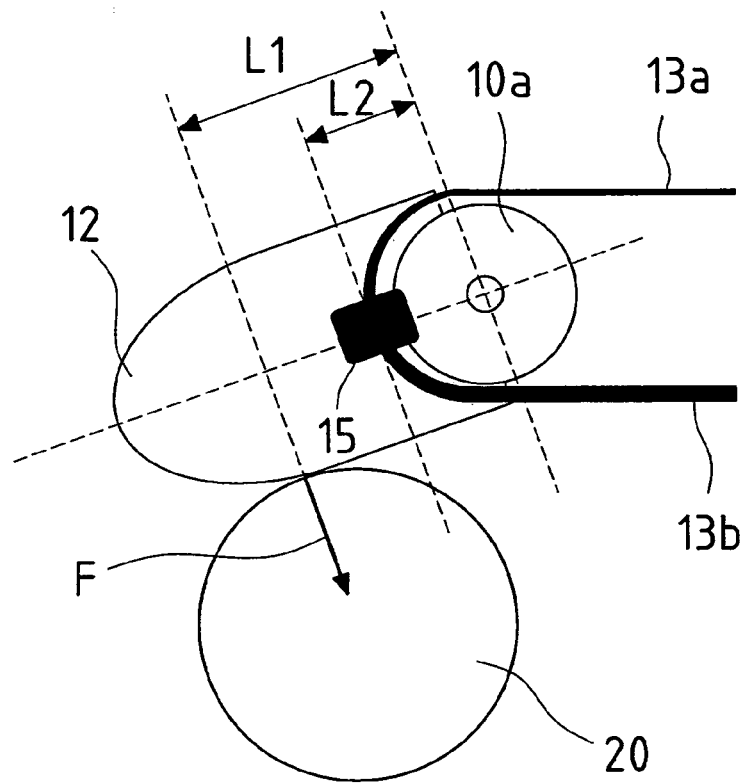
FIG. 3 is a figure showing the joint portion of the robot hand according to Embodiment 1 of the present invention.
Figure 3:
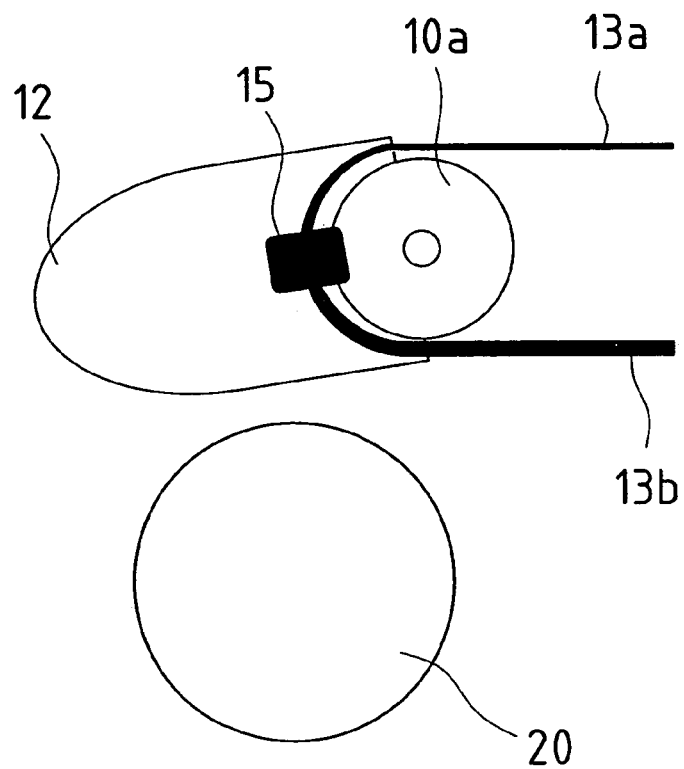

Accordingly, the output of the drive element 13a, which is the one of the drive elements 13a and 13b that is not involved in the grasping operation, can be reduced. For example, when the other drive element 13b contracts, as shown in FIG. 3(a), the finger tip portion 12 rotates toward the palm of the hand and makes contact with an object 20. The force with which the finger tip portion 12 acts on the grasped object 20 can be increased by contracting the drive element 13b further (that is to say, increasing the output) from this state, and thus increasing the grasping force. Therefore, the other drive element 13b needs an output greater than the force needed for the grasping operation.

However, when the one drive element 13a contracts, finger tip portion 12 rotates in the direction away from the palm of the hand and moves away from the object 20, as shown in FIG. 3(b). Therefore the output of the one drive element 13a can be reduced, because it is not involved in the grasping operation.

The following is an explanation of the output required by the drive elements 13a, 13b. The one drive element 13a is not involved in the grasping operation, hence it does not require a strong force, but it requires an output of the force necessary to rotate the joint portion 10a of the robot hand. Due to the frictional force that obstructs the rotation of the joint portion 10a and the load of the finger tip portion 12, for example, the output of the drive element 13a (in the present embodiment, this output is referred to as "Fa"), must be set so as to output a force that is greater than the force obstructing this rotation (in the present embodiment, this obstruction force is referred to as "F1").

The other drive element 13b has to output a force that is required for the grasping operation in addition to the obstruction force F1. Explaining this with reference to FIG. 3(a), in the event that the grasping force (in the present embodiment, this grasping force is referred to as "F") is applied to the grasped object 20, the output (in the present embodiment, this output is referred to as "F2") required by the other drive element 13b, can be expressed as:

$$F2 = F \times L1/L2 \quad (1)$$

where L1 is the distance from the center of the joint portion 10a to the point action of the grasping force, and L2 is the distance from the center of the joint portion 10a to the drive element connector 15 connecting the other drive element 13b and the joint portion 10a. The other drive element 13b has to output a force obtained by adding the output F2 to the obstruction force F1. Therefore, the output Fa required by the one drive element 13a and the output required by the other drive element 13b (in the present embodiment, this output is referred to as Fb), can be expressed as:

$$Fa = F1 \quad (2)$$

$$Fb = F2 \quad (3)$$

When the output of the one drive element 13a, which is not involved in the grasping operation, is reduced, the volume of the drive element 13a can be kept small, so that a robot hand of a size that is closer to the size of a human hand can be achieved. For example, the cross-sectional area of the one drive element 13a can be made smaller than the cross-sectional area of the drive element 13b. When the drive elements 13a, 13b are arranged as single elements, then making the cross-section area smaller means that the one drive element 13a is made smaller than the other drive element 13a. Moreover, if the drive elements are layered (this includes the case that they are bundled together), it means that the number of layers of the one drive element 13a can be reduced.

Next, as for the amount of expansion/contraction required by each of the drive elements 13a, 13b, it is necessary that this amount is set to be larger than the amount of stretching required to achieve the rotation angle of the joint portion 10a set for the finger tip portion 12. Moreover, if the drive elements 13a, 13b are made of the same material, their contraction factor and expansion factor are equal. Therefore, when the total length of the drive elements is the same, then the amount of expansion, and accordingly the amount of displacement is also the same.

Furthermore, it is preferable that each of the drive elements 13a, 13b can be controlled by an electric signal. The rotation angle of the joint portion 10a corresponds to the bending/stretching position of the finger tip portion 12 (the bending angle of the finger tip 12 with respect to the finger frame 11a). Moreover, the rotation angle of the joint portion 10a is determined by the amount of contraction and the amount of expansion of the drive elements 13a and 13b. Therefore, when the amount of contraction and the amount of expansion of the drive elements 13a, 13b cannot be controlled, then the position of the finger tip portion 12 cannot be determined, and a robot hand equivalent to a human hand cannot be created, because a complex grasping operation cannot be achieved. Accordingly, an even more complex grasping operation can be achieved when the drive elements 13a, 13b can be controlled by an electric signal and their amount of contraction and amount of expansion can be controlled by a computer, because a positioning of the tip portions in the entire grasping operation can be achieved.

Embodiment 2

FIGS. 5 to 9 show Embodiment 2 of the present invention. The drive elements 13a, 13b shown in the above-described embodiment are directly attached to the joint portion 10a and are wound around and off of the joint portion 10a. Moreover, since the drive elements 13a, 13b pass through the joint portions 10b, 10c and are attached to the joint portion 10a, they can bend in those locations through the rotation of the joint portions 10b and 10c which is advantageous in case that they provide a flexibility that allows them to bend flexible due to changing circumstances.

There are direct drive elements whose amount of contraction and amount of expansion is large but whose output is weak. The total length of such drive elements may be short, but to achieve the prescribed output, their cross-section area has to be enlarged. Such drive elements provided with a large cross-section area have the disadvantage of poor flexibility, and they hamper the driving of the joint elements 10a, 10b, 10c when they are passed through the finger mechanism and linked directly to the finger tip portion 12 like the drive elements 13a, 13b, so that a configuration as shown in the above-described Embodiment 1 is impossible. In view of this, a driving force transmission portion that transmits the driving force of such drive elements to the joint portions becomes necessary. Hereinafter a specific example will be explained.

Figure 5:
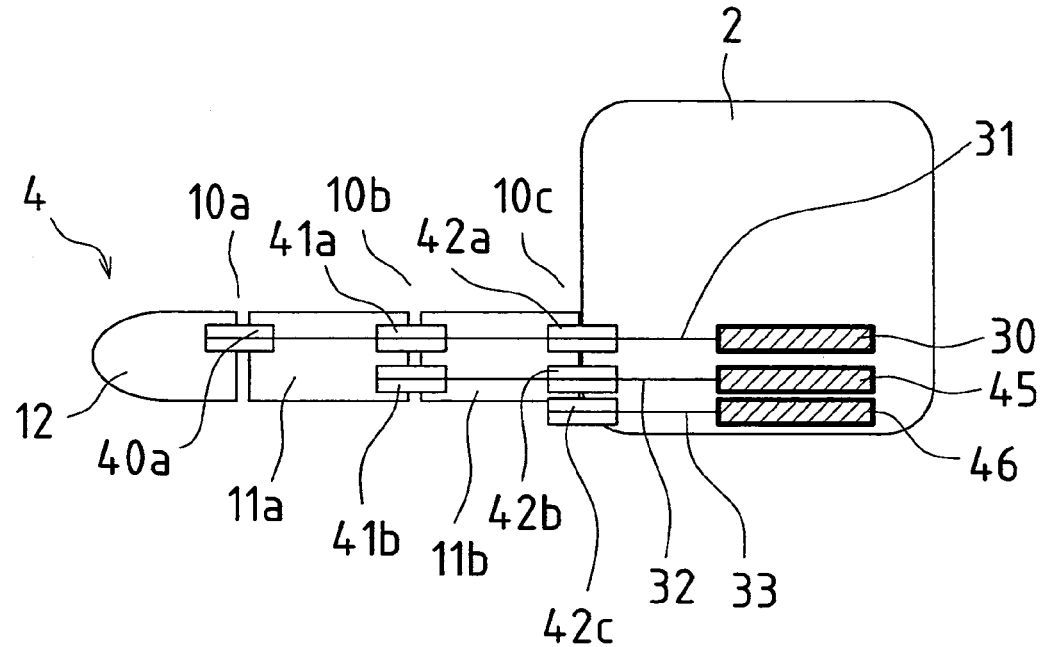
FIG. 5 is schematic front view of the finger mechanism of the robot hand according to Embodiment 2 of the present invention.
Figure 6:
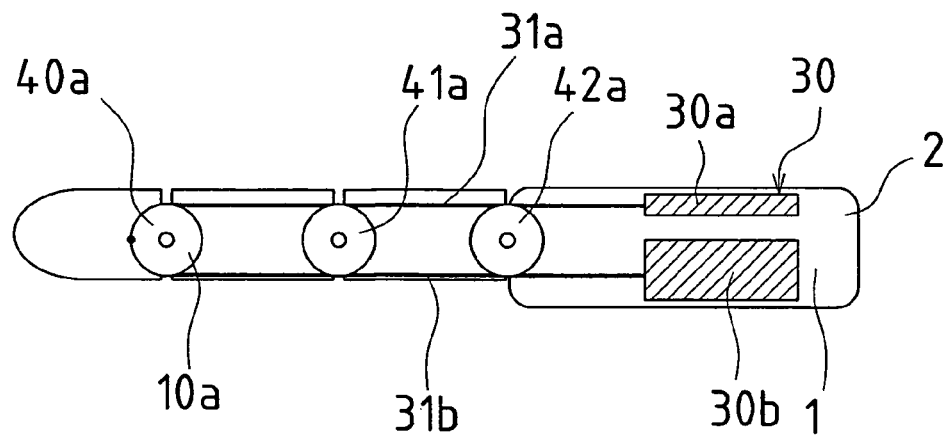
FIG. 6 is a schematic cross-sectional view of the finger mechanism of the robot hand according to Embodiment 2 of the present invention.

FIGS. 5 and 6 illustrate the structure of the finger mechanism 4. Graphic representation or detailed explanation of the other finger mechanisms will be omitted, because their structure is similar. The finger mechanism 4 comprises a plurality of finger frames 11a, 11b and the finger tip portion 12, which are linked to the joint portions 10a, 10b, 10c. The joint portion 10a includes the drive pulley 40a, the joint portion 10b includes the idler pulley 41a and the drive pulley 41b, and the joint portion 10c includes the idler pulleys 42a, 42b and the drive pulley 42c. One end of the driving force transmission portions 31, 32, 33 is respectively linked to each of the drive pulleys 40a, 41b, 42c, and the other ends of the driving force transmission portions 31, 32, 33 are respectively linked to the drive portions 30, 45, 46.

Hereinafter, the drive principle of the joint portions will be explained.

The drive portion 30 that drives the joint portion 10a includes two types of drive elements 30a, 30b with different outputs, as shown in FIG. 6. Both of the drive elements 30a, 30b are in disposed in the main frame 2. The driving force transmission portions 31a, 31b are respectively linked to the drive elements 30a, 30b, and the driving force transmission portions 31a, 31b, which pass the idler pulleys 42a, 41a, are linked to the drive pulley 40a of the joint portion 10a. Accordingly, the output of the drive elements 30a, 30b is transmitted by the driving force transmission portions 31a, 31b to the joint portion 10a and can drive the joint portion 10a.

In this case, the amount of expansion and the amount of contraction of the drive elements 30a, 30b can provide a sufficient rotation angle for grasping objects to the joint portion 10a, but since the volume is small when directly linking them to the joint portion 10a, an output that fulfills the above-mentioned equations (2), (3) cannot be generated. In view of this, an output that fulfills the above-mentioned equations (2), (3) can be generated when the drive elements 30a, 30b are linked via the driving force transmission portions 31a, 31b to the joint portion 10a, as shown in FIGS. 5 and 6, since then the drive elements 30a, 30b can be disposed in the main frame 2 and the volume of the drive elements 30a, 30b can be enlarged.

In view of this, examples of the driving force transmission portion 31a, 31b are wires or belts, whose cross-section area is small and that have superior flexibility and tensile strength. It is also possible to arrange a plurality of gears and transmit the driving force, but considering their light weight and compact size, wires are preferable.

Also in the present Embodiment 2, the entire robot hand will become unnecessarily large when the driving elements 30a, 30b are enlarged beyond necessity, so it is preferable to set the one drive element 30a, which is not involved in the grasping operation, so as to fulfill the above-mentioned equation (2) and to set the other drive element 30b, which is involved in the grasping operation, so as to fulfill the above-mentioned equation (3). By doing this, the drive element 30a can be downscaled to compact size and a smaller robot hand can be achieved.

In the present Embodiment 2, the drive elements 30a, 30b are disposed in the main frame 2, but there is no limitation to this. It is also possible to dispose the drive elements in a region outside the robot hand, for example in the wrist or the arm. In this case, the connection between the joint parts can be achieved by the driving force transmission portions. If the drive elements are disposed in a region outside the robot hand, such as in the wrist or the arm, the robot hand not only becomes compact in size but also the robot hand itself becomes lighter in weight. Thus, the load on the arm to which the robot hand is attached is reduced, so that the driving force of the wrist decreases, and as a result, the positioning control of the arm can be simplified.

Figure 7:
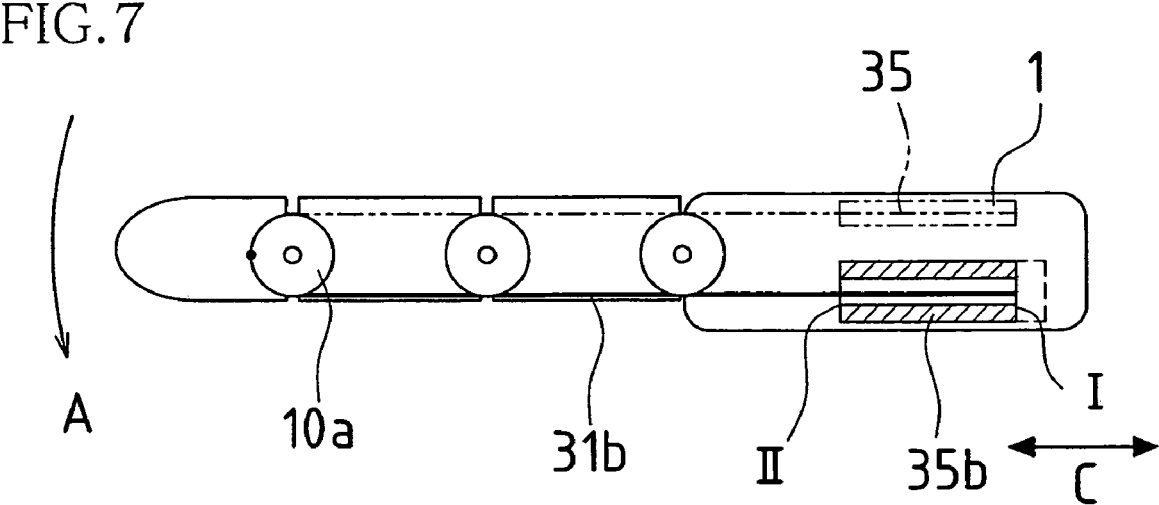
FIG. 7 is a schematic cross-sectional view showing a modified example of Embodiment 2 of the present invention.

FIG. 7 shows a configuration, in which drive elements whose length can be expanded by an electric signal. In this FIG. 7, the other drive element 35b and the joint portion 10a are linked by the driving force transmission portion 31b. The drive element 35b is the drive element involved in the grasping operation. The one drive element 35a, which is not involved in the grasping operation, is represented by a phantom line, and its further explanation is omitted because the drive element 35a has the same configuration.

The other drive element 35b has a hollow structure and the driving force transmission portion 31b is inserted into it and fixed to the one end face I (the end face facing away from the joint portion 10a). The other end face II of the drive element 35b (the end face near the joint portion 10a) is fixed to the main frame 2. The one end face I of the drive element 35b is the free end.

Accordingly, the drive element 35b is expanded and contracted by an electric signal, so that the other end face II stays fixed and the one end face I shifts in the direction marked by the arrow C. If the driving force transmission portion 31b were linked to the other end face II of the drive element 35b and the other end face II were arranged to move freely, then the drive element 35b would be expanded through an electric signal, so that it would not be possible to grasp an object without turning the joint portion 10a in the direction of the palm of the hand. But if the driving force transmission portion 31b is linked to the one end face I of the drive element 35b, the one end face I of the drive element 35b is expanded by an electric signal in the direction marked by the arrow C, and accordingly the joint portion 10a can be rotated in the direction marked by the arrow A and an object can be grasped.

Also, if the drive element would not have a hollow structure and the driving force transmission portion 31b would be linked to the one end face I along the outside of the drive element, then a route to secure the path of the driving force transmission portion 31b or a new structure for linking the one end face I would have to be added, enlarging the configuration of the robot hand. Thus, it is preferable that a hollow part is provided in the drive element 35b and the driving force transmission portion 31b is passed through the middle and linked to the one end face I.

The other end face II of the drive element 35b is fixed to the main frame 2, but the one end face I is a free end, which can be driven. However, when the route in which the drive element 35 contracts and expands is not determined, there is a risk that the drive element 35b breaks other parts of the robot hand, because it is flexible and can extend in any direction inside the main frame 2, and the desired output is not achieved and the grasping force is not stable.

Figure 8:
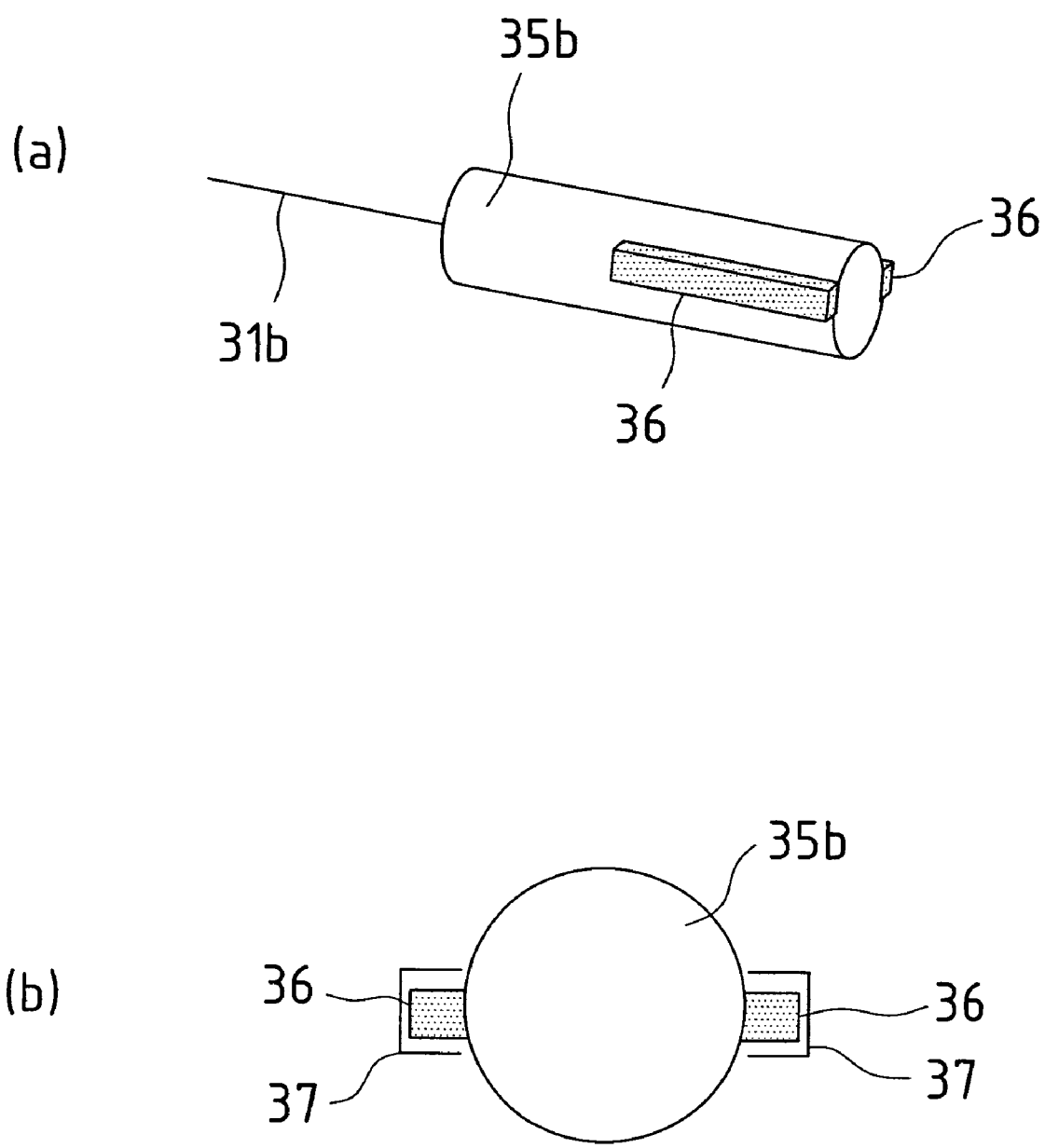
FIG. 8 is a figure showing the drive elements of the robot hand according to the present invention.
Figure 9:
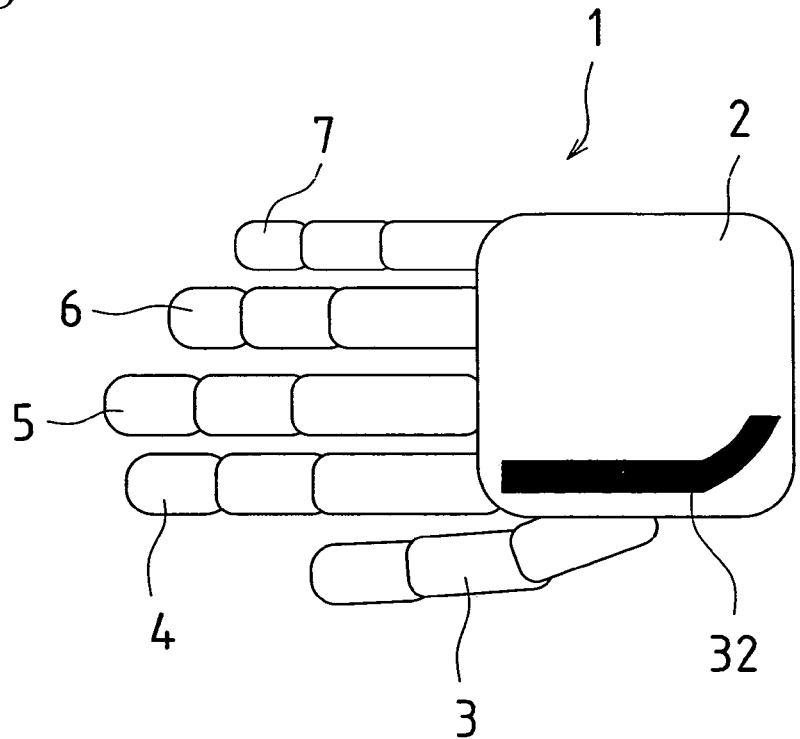
FIG. 9 is a figure showing the arrangement of the drive elements of the robot hand according to the present invention.

In view of this, it is preferable to provide the drive element 35b with a guide means, as shown in FIG. 8. FIG. 8(a) is a perspective view of the drive element 35b, and FIG. 8(b) is front view of the element 35b. An extension route fixing guide jig 36 is provided along the sides of the drive element 35b. As shown in FIG. 8(b), this extension route fixing guide jig 36 is passed through the inside of an extension route fixing guide 37 that is attached to the main frame 2 and guides the direction of expansion and contraction of the drive element 35b. In FIG. 8(b), the drive element 35b is driven in the direction vertical to the paper plane. Therefore, the drive element 35b expands and contracts along the guide route of the extension route fixing guide 37, arranged inside the mainframe 2.

The present invention is not limited to the above-described embodiments, and if the drive element 32 is flexible, it is possible to further downscale the installation of the drive element 32. As for example shown in FIG. 9, it is possible to bend the drive element 32 a little so that it fits into the main frame 2. Since the drive element is flexible, the installation of the drive element can be freely controlled and the design of the robot hand can be performed regardless of the shape of the drive element.

Figure 10:
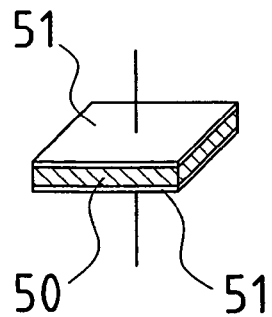
FIG. 10(a) is a schematic perspective view of a polymer actuator in a contracted state according to an embodiment of the present invention.
FIG. 10(b) is a schematic perspective view of the polymer actuator in an expanded state according to an embodiment of the present invention.
Figure 10:
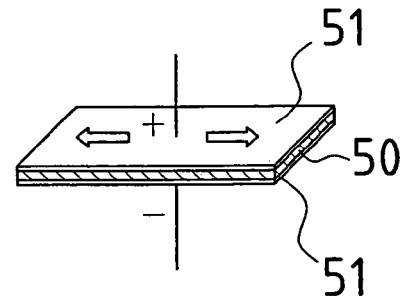

In each of the above-described embodiments, the drive elements 13a, 13b, 30a, 30b, 35a, 35b, 32 have been explained to be drive elements using a polymer actuator. In view of this, next an example of a polymer actuator used in the embodiments will be described with reference to FIG. 10. The polymer actuator shown in FIG. 10 is a direct-drive actuator, in which polymer material 50 is supported by a pair of electrodes 51 (two electrodes). In this polymer actuator, when a voltage is applied to the pair of electrodes 51 from a state where no voltage is applied to the electrodes 51 (see FIG. 10(a)), then the pair of two electrodes 51 and the polymer material 50 sandwiched between the pair of two electrodes 51 are extended in the direction marked by the arrows, as shown in FIG. 10(b). By using a polymer actuator, it is not only possible to control the strokes of the drive elements electrically, but also to increase the response speed and the positioning precision. Moreover, with a polymer actuator as shown in FIG. 10, it is possible to generate a comparatively strong force.

Furthermore, in the above-described embodiments, cases are illustrated in which a polymer actuator is used for the drive elements 13a, 13b, 30a, 30b, 35a, 35b, 32, but there is no limitation to this. Any type of direct-drive actuator can be employed. There are for example electrostatic actuators using electrostatic forces, or actuators made of shape-memory alloys. It is possible to apply the present invention to these actuators. At present, direct-drive actuators are developed from various different materials, but since there is no limitation regarding the material, also all direct-drive actuators developed from here on can be employed.

In a robot hand according to the present invention, it is also possible to provide a contact sensor, a force sensor, or both in the finger tip portion of each finger mechanism. A contact sensor detects the contact between the grasped object and the finger tip portion, so that with such a sensor stat of the contact can be recognized and the grasping state can be confirmed. Moreover, with a force sensor, by detecting the force on the grasped object, an appropriate grasping force can be applied to the grasped object. The question which of these sensors should be installed will depend on the application of the robot hand, but in order to realize a robot hand for versatile grasping operations, it is preferable to equip it with both sensors.

A robot hand was explained in the present embodiments, but there is no limitation to this. The present invention can also be employed in the joint drive mechanism in many more places, as for example robot arms or robot legs. Moreover, it is not limited to the field of robots. The present invention can be advantageously applied in any place that performs rotation drives and the drive elements use not a motor but a direct-drive actuator,.

The present invention can be embodied and practiced in other different forms without departing from the spirit, gist and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. A robot hand, comprising:
   a main frame;
   a plurality of finger mechanisms connected to the main frame and including a plurality of joint portions; and
   a plurality of drive portions driving the joint portions,
   wherein the drive portions comprise a plurality of drive elements with different outputs, and each of the drive elements of the drive portions is capable of being expanded or contracted in accordance with an applied electrical signal, and
   wherein:
   when F is a grasping force operating on a grasped object;
   L1 is a distance from the center of the joint portion to the point of action of the grasping force;
   L2 is a distance from the center of the joint portion to the point of action of the output of the drive elements;
   F1 is a force preventing a rotational driving of the joint portion;
   Fa is the output of the drive element with the weaker output; and
   Fb is the output of the drive element with the stronger output;
   then Fa and Fb can be respectively expressed as Fa=F1, and $Fb = F1 + F2$, where $F2 = F \times L1/L2$).

2. The robot hand according to claim 1,
   wherein the drive portion comprises two drive elements, each drive element having a different output;
   wherein the drive element with the stronger output is driven when the robot hand grasps an object; and
   wherein the drive element with the weaker output is driven when the robot hand releases the object.

* * * * *